Oct. 24, 1961  A. R. SPICACCI  3,005,297
METHOD OF MANUFACTURING A RACEWAY
Original Filed Feb. 6, 1959  2 Sheets-Sheet 1

INVENTOR.
ATTILIO R. SPICACCI
BY Robert R. Yautie
ATTORNEY.

Oct. 24, 1961     A. R. SPICACCI     3,005,297

METHOD OF MANUFACTURING A RACEWAY

Original Filed Feb. 6, 1959     2 Sheets-Sheet 2

INVENTOR.
ATTILIO R. SPICACCI
BY
Robert K. Yeate
ATTORNEY.

United States Patent Office 3,005,297
Patented Oct. 24, 1961

3,005,297
METHOD OF MANUFACTURING A RACEWAY
Attilio R. Spicacci, Germantown Manor, Greene and Hortter Sts., Philadelphia, Pa.
Original application Feb. 6, 1959, Ser. No. 791,629, now Patent No. 2,971,387, dated Feb. 14, 1961. Divided and this application Sept. 28, 1959, Ser. No. 842,754
4 Claims. (Cl. 51—291)

This invention relates generally to the manufacture of raceways, and is especially concerned with the grinding of the outer raceway element of a bearing-type construction.

This application is a division of my copending patent application Serial No. 791,629, filed February 6, 1959, now Patent No. 2,971,387, dated February 14, 1961.

It is a general object of the present invention to provide a unique, extremely simple, highly accurate, and entirely reliable method of manufacturing an outer raceway element for a bearing construction, and particularly for an outer raceway element of the bearing construction shown in said copending patent application.

This invention further contemplates the provision of a method of the character described which is highly economical and practical for use under practical manufacturing conditions.

Other objects of the present invention will become apparent upon reading the following specification and referring to the accompanying drawings, which form a material part of this disclosure.

The invention accordingly consists in the features, combinations, and arrangements of method steps, which will be exemplified in the following description, and of which the scope will be indicated by the appended claims.

Figure 1:
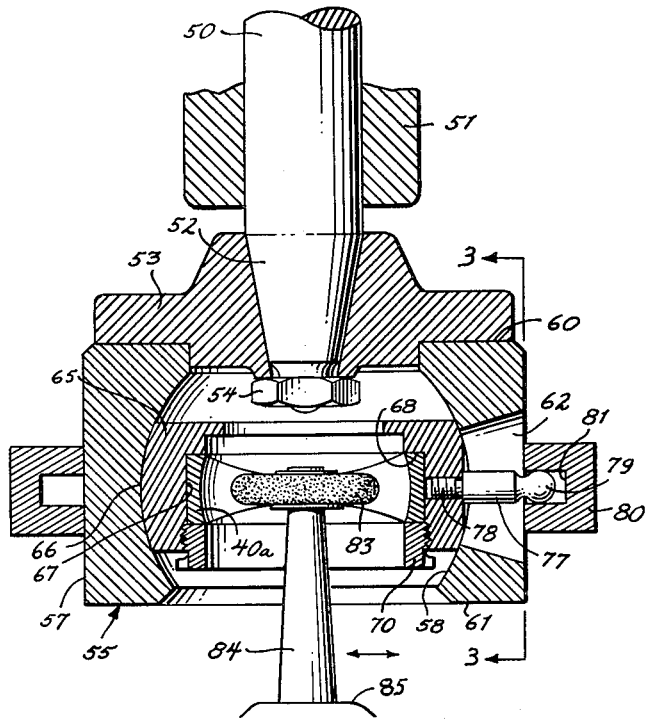
FIGURE 1 is a longitudinal sectional view illustrating apparatus illustrating one stage of the method of the present invention.
Figure 2:
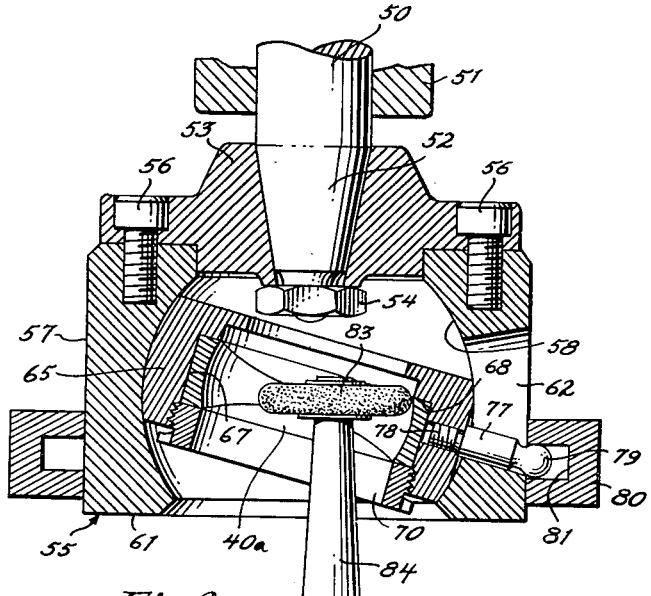
FIGURE 2 is a sectional view similar to FIGURE 1 illustrating another stage in practice of the instant manufacturing method.
Figure 3:
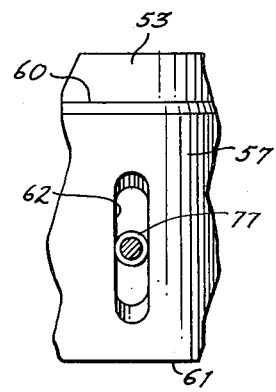
FIGURE 3 is a partial sectional view taken substantially along the line 3—3 of FIGURE 1 illustrating a detail of the apparatus.

Referring now more particularly to the drawings, and specifically to FIGURES 1–4 thereof, an axially rotatable work spindle 50 is shown in FIGURES 1 and 2 as supported in a journal 51 and overhanging the latter, having its overhanging region 52 outwardly tapered. A centrally apertured faceplate 53 is circumposed about and seated on the spindle portion 52, being clamped thereon by a locknut 54 threaded on the distal end of the work spindle.

A generally annular member or chuck 55 is carried by the plate 53 for rotation therewith about the axis of the work spindle 50, and clamped to the plate by fasteners 56, see FIGURE 2. The chuck 55 is generally concentric with the work spindle 50 having a generally cylindrical outer surface 57 coaxial with the work spindle, and a generally spherical internal surface 58 having its center of curvature along the work-spindle axis. Thus, the annular chuck 55 is generally concentric with the work spindle 50, having its inner-and outer-side faces 60 and 61 substantially parallel to each other and normal to the work-spindle axis, with the innerside face or surface 60 bearing against the plate 53, and the outer surface 61 facing outward away from the plate and having a central opening communicating with the interior of the chuck. A slot 62 is formed in the annular chuck 55 extending longitudinally thereof spaced medially between the inner and outer surfaces 60 and 61. Thus, the slot 62 extends generally parallel to the axis of spindle 50, and lies in a plane containing said axis.

Interiorly of the annular outer chuck member 55 is an annular inner chuck member or workholder 65. The annular workholder has its outer surface 66 generally spherical for conforming and relative sliding engagement with the spherical internal surface 58 of the outer chuck member. The center of curvature of the spherical outer surface 66 lies on the axis of the central through opening 67 of the annular member 65; and, an internal shoulder 68 is provided in the opening 67. The central opening 67 of the annular workholder 65 is adapted to receive an annular workpiece 40a with one side of the workpiece bearing against the internal shoulder 68, and to be clamped in position thereagainst by a clamping ring 70 threaded into the opening 67. As will appear presently, the workpiece 40a is adapted to be formed into an outer bearing element or raceway in accordance with the instant method.

Figure 4:
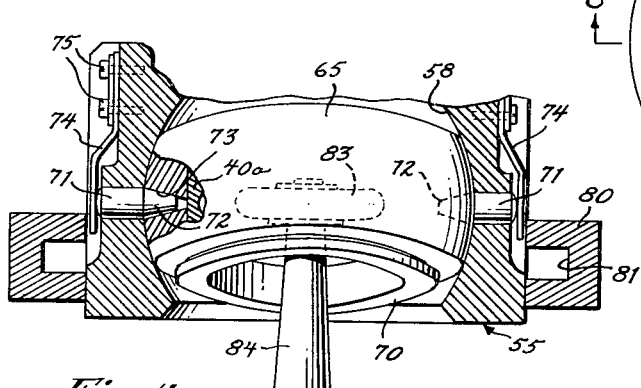
FIGURE 4 is a view taken from the left of FIGURE 2, partially illustrating the apparatus thereof, and partly in section to facilitate understanding of the instant method.
Figure 6:
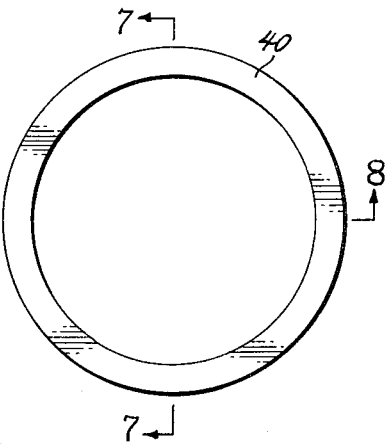
FIGURE 6 is an elevational view showing an annular outer race or bearing element of the bearing of FIGURE 5.

In a plane at approximately 90° with respect to the plane of slot 62 formed in the chuck member 55, there are provided a pair of aligned pivot pins 71, see FIGURE 4, extending radially inward through diametrically opposed regions of the chuck member 55 and entering into diametrically opposed regions of the workholder 65. The pins 71 have their inner-end regions 72 of conical configuration, each being conformably received in a conical, generally radially disposed bore 73 of the annular inner member 65, thereby constraining the latter member to pivotal movement relative to the outer member about a diametral axis defined by the aligned pins 71. That is, the internal annular member 65 is rotatable with the outer member 55 about the axis of work spindle 50, and pivotable relative to the member 55 about the axis of the aligned pins 71. Such pins may be removably held in position by resilient retainer elements 74 secured to the outer member 55 by fasteners 75, and located in external recesses of the outer member so as to lie entirely beneath the cylindrical external surface thereof 57.

An arm 77, see FIGURES 1 and 2, may be fixed to the internal annular member 65, as by a threaded connection 78, and projects generally radially outward from the internal annular member through and beyond the slot 62, where it is provided with a head 79, preferably of generally spherical configuration. An internally grooved annular guide member 80 is circumposed slidably about the exterior of the outer chuck member 55, and formed with an internal annular channel 81 slidably receiving the head 79 of arm 77. By any suitable means (not shown), the annular guide member 80 is adapted to be moved longitudinally of the chuck member 55 while the latter is axially rotating.

A working tool 83 is shown in position interiorly within the internal annular chuck member or workholder 65, being carried by a shaft 84 connected to a suitable power-transmission device 85 exteriorly of the chuck member 55. The illustrated working tool 83 is a toroidal grinding wheel, rotatable with the shaft 84, but any suitable metalworking tool may be similarly employed, as will appear presently. The working tool 83, as by its power transmission 85, is mounted for axial movement into and out of position within the workholder 65, and there movable radially into and out of engagement with the internal surface of the workpiece 40a.

In accordance with the instant method, the spindle 50 is axially rotated to effect axial rotation of the plate 53, outer and inner chuck members 55 and 65, and of the annular workpiece 40a. Simultaneously, the annular internal channel or guide 80 is moved axially to effect an oscillating rotary motion of the internal annular member or workholder 65, together with the workpiece 40a relative to the axially rotating outer member 55. The workpiece 40a is thus simultaneously axially rotated and oscillated about a diameter thereof. If the working tool 83 is then moved into engagement with the internal surface of the workpiece 40a, an internal grooved configuration is formed therein as will be described hereinafter in greater detail. For symmetry of formation of the internal grooved configuration of the workpiece 40a, it is desirable that the workpiece be located symmetrically with respect to the oscillatory pivotal axis of pins 71, and that the working tool 83 also be located symmetrically with respect to such axis.

After the desired internal grooved configuration is formed in the workpiece 40a it is only necessary to radially withdraw the working tool 83 from engagement with the workpiece, and then axially withdraw the working tool from the chuck member 55. Of course, the workpiece 40a may be removed from the workholder 65 by mere removal of the clamping ring 70.

Figure 5:
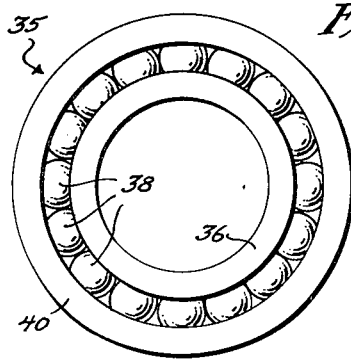
FIGURE 5 is an elevational view showing a bearing or bearing-type structure constructed in accordance with the instant method.

A bearing or bearing-type structure adapted to be manufactured in accordance with the instant method is shown in FIGURE 5, and there generally designated 35. The bearing construction 35 includes an inner, annular bearing element or race 36 which may be conventional and formed on its external peripheral surface with an annular external groove of constant cross-sectional configuration and extending circumferentially about the inner race. As the inner element or race 36 may be entirely conventional, and as its grooved configuration is shown in said copending patent application, additional illustration herein is unnecessary.

The circumferential external groove of the inner race 36 receives an annular array of rollable elements or balls 38 circumferentially thereabout, which rollable elements may also be conventional so as not to require further description or illustration.

The bearing assembly 35 further includes an annular outer bearing element or race 40, which is formed from the workpiece 40a in the manner described hereinbefore, and extends circumferentially about the annular array of rollable elements 38. That is, the inner periphery or internal surface of the outer annular element or race 40 is in bearing reception with the rollable elements or balls 38, so that the balls are intermediate bearing elements located between and in bearing engagement with the inner and outer races.

Figure 7:
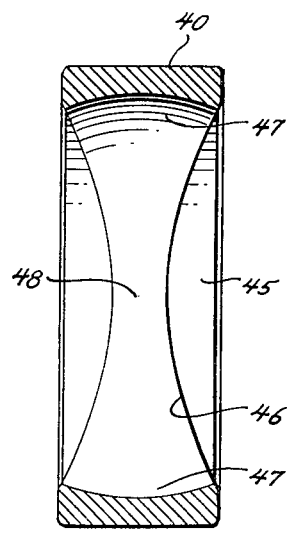
FIGURE 7 is a sectional view taken substantially along the line 7—7 of FIGURE 6.
Figure 8:
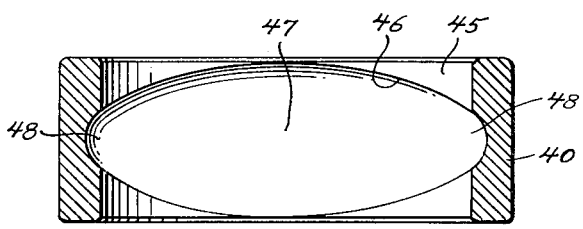
FIGURE 8 is a sectional view taken substantially along the line 8—8 of FIGURE 6.

As best seen in FIGURES 7 and 8 the outer annular bearing element or race 40 is formed by the instant method on its inner periphery or internal surface 45 with a specifically contoured groove 46 for bearing reception with the intermediate bearing elements or balls 38. The internal, annular groove 46 of the outer race 40 is configured to have alternately narrow and wide regions merging smoothly with each other, the wide and narrow regions each being two in number, so that the groove may be generally considered as of an hourglass shape in development, say if the configuration were developed in a plane starting from one narrowmost region. Further, the relatively wide pair of groove regions, designated 47, are located in diametrically opposed relation along the section line 7—7, while the relatively narrow pair of groove regions, designated 48, are located in diametrically opposed relation along the section line 8—8. Thus, the adjacent wide and narrow regions of groove 46 are spaced apart approximately 90° from each other. The cross-sectional configuration of the relatively narrow groove portions 48 may be such as to conformably receive outer portions of the intermediate rollable bearing elements or balls, say having substantially the same radius of curvature as the balls, while the relatively wide groove portions 47 have a radius of curvature in cross section approximately equal to the maximum internal radius of the outer race, such radius lying in a central plane of the outer race in the illustrated embodiment. Between these regions of maximum and minimum groove width, the radius of curvature in cross section varies gradually and continuously between its maximum at the relatively wide groove regions and minimum at the relatively narrow groove regions, this being another way of defining the configuration of the internal annular groove 46.

While the specific construction of bearing 35 and the internal grooved configuration of the outer race 40 may not properly be a part of the instant method, the detailed description thereof is believed desirable to facilitate understanding of the method.

While the speed of rotation of the spindle 50 is contemplated as being high relative to the frequency of reciprocation of the guide member 80, so that the complete internal groove 46 as described hereinbefore will definitely be formed, it may under certain circumstances be desirable to properly time the said rotation and reciprocation in an out-of-phase relationship to insure complete formation of the desired internal-groove configuration.

As seen in the drawings, see FIGURES 1 and 2, the grinding wheel or tool 83 is of a toroidal configuration having its peripheral or working surface of a cross section with a radius of curvature substantially equal to the radius of curvature of the balls 38 the finished bearing. Thus, the relatively narrow regions 48 of the groove 46 conformably receive the balls 38 while the relatively wide groove regions 47 are in bearing contact at any point in their width with the balls.

Therefore, in the resultant assembled bearing manufactured by the instant method, one of the annular bearing elements is formed with a race groove of constant cross sectional configuration conforming to the bearing surfaces of the rollable elements, which may be conventional. The other annular bearing element (the outer bearing element 40 in the illustrated embodiment) is formed with a groove receiving the rollable elements, which groove is cross-sectionally configured at one diameter to substantially conform with the bearing surfaces of the rollable elements and cross-sectionally configured at all other diameters to afford substantial relative angular movement between the annular bearing elements about said one diameter while maintaining the rollable elements in bearing engagement with the annular elements.

It is now appreciated and understood that the present invention provides a highly advantageous method of manufacturing a race or bearing element, which method fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. In the method of manufacturing a bearing element, the steps which comprise: providing an annular member, axially rotating said member, oscillating said member about a diameter fixed relative to said annular member simultaneously with said rotation, and engaging a working element with a peripheral surface of said annular member during said rotation and oscillation.

2. The method according to claim 1, further characterized by oscillating said annular member in an out-of-phase timed relation with said axial rotation.

3. The method according to claim 1, further characterized by engaging said working element with the internal peripheral surface of said annular member.

4. The method of manufacturing a bearing element which includes, axially rotating an annular member, oscillating the annular member about a diameter thereof and fixed relative thereto during said rotation, and engaging a working tool with a peripheral surface of the annular member during said rotation and oscillation.

References Cited in the file of this patent

UNITED STATES PATENTS

| | | |
|---|---|---|
| 1,388,182 | Hanson | Aug. 23, 1921 |
| 1,815,014 | Smith | July 14, 1931 |
| 1,985,531 | Swenson | Dec. 25, 1934 |
| 2,492,935 | McCulloch | Dec. 27, 1949 |
| 2,797,472 | Kosche | July 2, 1957 |